INVENTORS
WILLIAM L. KELLEHER
THOMAS GARBER
BY Mortenson and Weigel
ATTORNEYS

United States Patent Office 3,491,299
Patented Jan. 20, 1970

3,491,299
TRANSDUCER MODULATION APPARATUS WITH TRANSDUCER OPERATING AT OTHER THAN OUTPUT FREQUENCY
Thomas Garber, Framingham, and William L. Kelleher, Newburyport, Mass., assignors to Hewlett-Packard Company, Palo Alto, Calif., a corporation of California
Filed May 17, 1967, Ser. No. 639,152
Int. Cl. H04b 1/04
U.S. Cl. 325—153                        6 Claims

ABSTRACT OF THE DISCLOSURE

Apparatus is provided for exciting a sensor at a frequency different than that available from the associated signal processing equipment. The sensor output signal which varies in amplitude and phase in accordance with an input signal is employed to amplitude modulate whatever carrier frequency is readily available to provide a modulated, suppressed carrier signal for transmission of the sensor output information.

---

Figure 1:
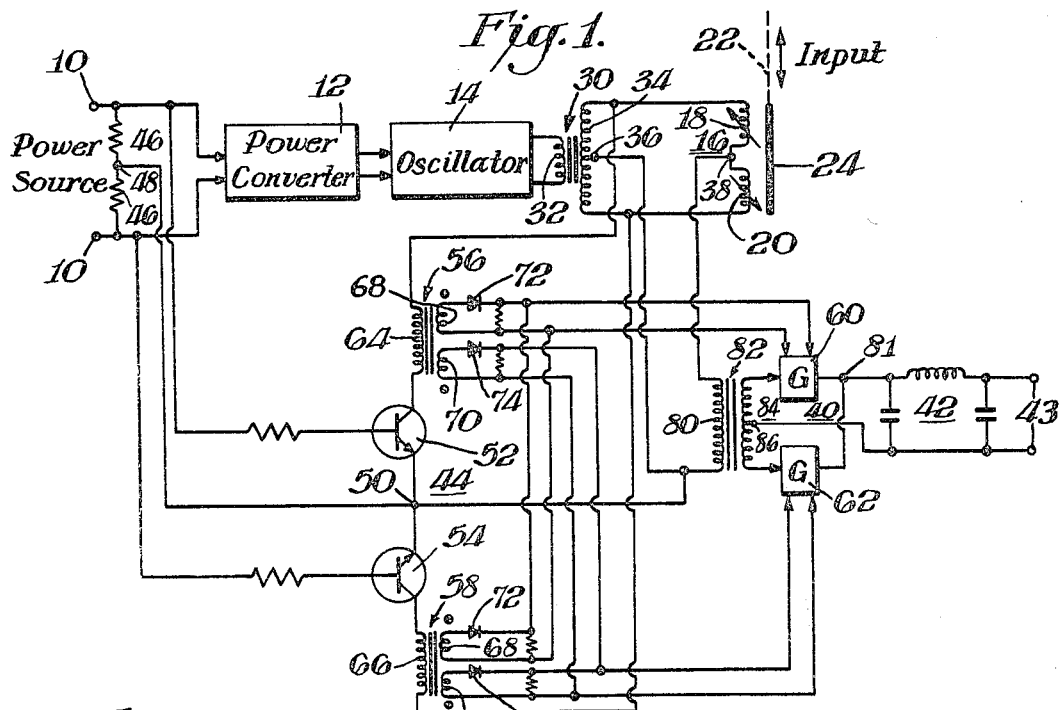

This invention relates to transducers and, more particularly, to apparatus for operating a basic sensor from a power supply of any frequency including zero frequency (direct current) and yet provides an output signal in the form of an amplitude modulated signal having a carrier frequency that is synchronous with the power supply frequency.

It is known to operate transducers to provide an electrical signal indicative of the physical position or displacement of a mechanical or other input signal. The mechanical input signal may be derived, for example, from a flowmeter, a force measuring device, a temperature responsive device, a pressure sensitive element, and the like. In the alternative, the input signal may be electrical in nature. A typical transducer may comprise no more than a balanced bridge network, which when balanced provides a zero or no output signal. The input signal varies the impedance of an element of a bridge network. This unbalances the bridge to a degree determined by the input signal. The input signal thus is converted by the bridge to an electrical signal which is the product of the bridge excitation and input signals. The amplitude and phase of this signal varies in accordance with the magnitude and sense of the input signal.

When using these transducers, particularly those linked up with signal conditioning, computing, or control apparatus, it is often desirable to transmit the output of the transducer on a carrier frequency compatible with the conditioning apparatus. A problem encountered is that at the various remote sensing locations, the number of power supply frequencies available for the transducer may be limited. While it is preferable to operate the transducer at its optimum frequency, unfortunately this has not always been possible in the past, due to this lack of available sources of power. Freedom of selecting the transducer operating frequency offers many advantages. Among these are less sensitivity to changes in temperature and vibration. Smaller mass mechanical elements frequently can be used if the basic sensor excitation frequency can be independently chosen. This results in a decrease in the vibration or acceleration sensitivity. Operating the sensor at an excitation frequency removed from that of local electrical and magnetic disturbances permits the filters to more effectively reduce undesirable noise and interference.

There is still another problem to be considered. Reactive element sensors are not generally usable on a wide range of excitation frequencies, including direct current (D.C.). For example, a reactive element sensor designed for use with a recording system employing a 10 kilocycle (kc.) carrier would most likely not be usable with a system employing a 400 cycles per second (c.p.s.) carrier. This means that a transducer manufacturer must carry two different sensor models, one for 10 kc. and one for 400 c.p.s. It would be preferable to carry one sensor operating at its optimum frequency regardless of the availability of local power, which can be used with transducer systems of any frequency.

Accordingly, one object of the invention is to make reactive element sensors compatible with many different transducer systems.

Another object of this invention is to obviate many of the disadvantages inherent in the prior art transducer transmission systems.

Another object of this invention is to provide an improved transducer apparatus in which the basic sensor is capable of being powered by a frequency different than that used to transmit the information to a central point.

In accordance with a preferred embodiment of this invention, a locally available power source is coupled to a universal power converter for conversion to direct current. This direct current is used to power the exciting oscillator of a reactive element sensor which provides an output signal varying in amplitude and having a phase or paraphase in accordance with the magnitude and sense, respectively, of an input signal. The transducer output is then passed to a modulator which is controlled by the power supply and oscillator frequencies. The modulator operates on the sensor output signal to construct, by properly synchronized gates, a new output signal having a suppressed carrier of the power supply frequency modulated in accordance with the original input signal.

Figure 2:
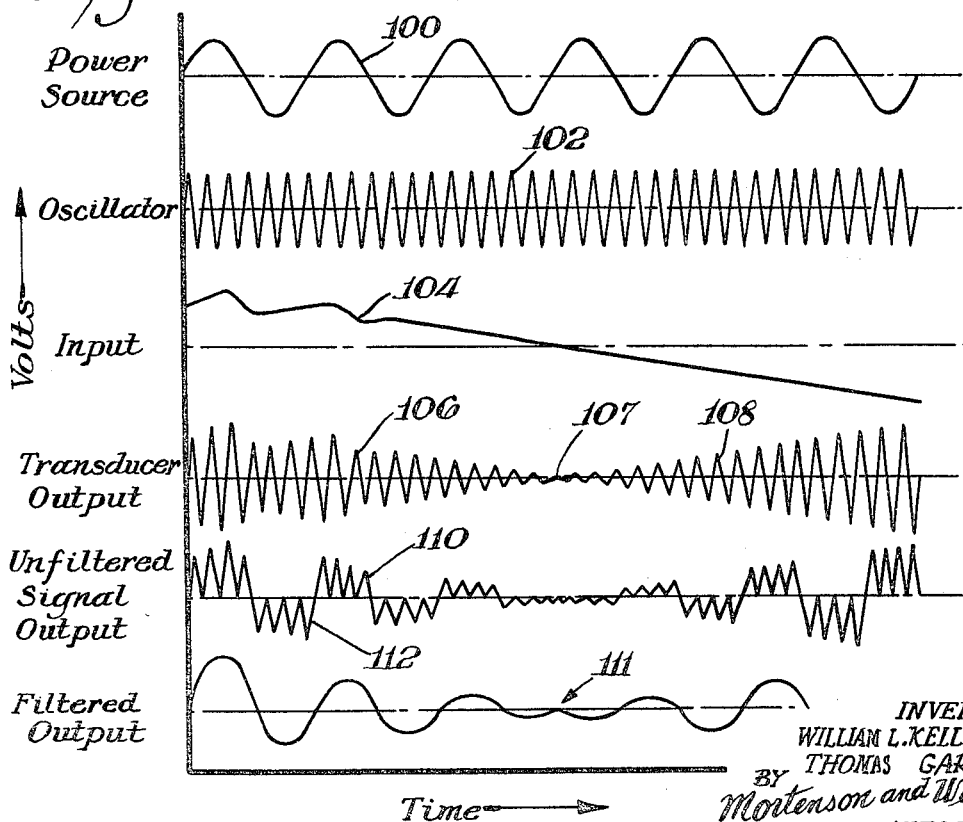

The novel features which are considered characteristic of this invention are set forth with particularity in the appended claims. The invention, itself, however, both as to its organization and method of operation, as well as additional objects and advantages thereof will best be understood from the following description when read in connection with the accompanying drawings, in which:

FIGURE 1 is a part block, part schematic diagram of a preferred embodiment of the transducer-transmitter of this invention; and FIGURE 2 comprises a series of wave forms in which the voltage or magnitude is plotted as a function of time to show the operation of the circuit illustrated in FIG. 1.

In FIG. 1 of the drawing there is shown a transducer system including a pair of input terminals 10 which are adapted to be connected to whatever local power source is available at the location the transducer is to be placed. The input terminals 10 are connected to a universal power converter 12 whose function is to convert the input power signal from the power source, whether it be alternating current (A.C.) or direct current (D.C.) of either polarity into a unipolar direct current (D.C.) signal. One suitable power converter of this type is described in a patent application Ser. No. 623,038, filed Mar. 14, 1967 by Garber et al., and now Patent No. 3,434,034 issued Mar. 18, 1969. The D.C. output of the power converter 12 in turn is connected to an oscillator 14 to which it supplies power. The oscillator 14 in turn supplies the exciting frequency for a sensor 16.

The sensor 16 is in the form of a half-bridge circuit in which one arm of the bridge is a reactive element illustrated as an inductance 18 and the remaining arm of the half-bridge circuit is another inductance 20. The inductances 18 and 20 are of equal value and adapted to have their reactance value varied in equal but opposite senses in accordance with the magnitude and sense of an input signal. The input signal is coupled by way of a mechanical linkage, denoted by the dotted line 22, to a magnetic element 24, the position of which varies the inductance of the inductors 18 and 20, respectively. Although inductors 18 and 20 are illustrated, it is to be understood that any other reactive element, for example, variable capacitors, could be used instead. For that matter, variable resistor pickoffs of the type described in U.S. Patent 3,089,990 issued May 14, 1963 to Johnson could be used if desired. In general any element which produces either phase or paraphase output signals in accordance with the sense of the input signal and which varies amplitude of the input carrier in accordance with the magnitude of the input signal can be used as desired.

The half-bridge of the sensor 16 is excited with a carrier frequency by a transformer 30 whose primary winding 32 is energized by the oscillator 14 and whose secondary winding 34 has either end connected across the series combination of the inductors 18 and 20, respectively. The secondary winding 34 is center tapped such that the output of the bridge 16 may be taken from the center tap 36 of the secondary and a center point or junction 38 between the two inductors 18 and 20.

The output of the sensor 16, taken from terminals 36 and 38 is applied to the input of a wave form synthesizing circuit 40 which synthesizes the desired signal. The output of the synthesizing circuit 40 is coupled through a low pass, pi-type filter network 42 to a pair of output terminals 43 for transmission to the desired information location. The gating or local carrier signals for the wave form synthesizing circuit 40 are supplied by a synchronizing circuit 44 which derives its input from the input terminals 10 and the transformer 30. A voltage divider, comprising equal valued serially connected, resistors 46, is coupled across the input terminals 10 to provide a neutral point 48 at the junction of the resistors. This neutral point 48 is coupled to a common point 50 in the synchronizing circuit 44. The synchronizing circuit 44 includes a pair of NPN transistor switches 52 and 54, respectively. Each of the transistors used in the switches 52 and 54 are coupled in common emitter configuration such that their respective outputs are coupled through transformers 56 and 58, respectively, to gates 60 and 62, respectively, in the synthesizing circuit 40.

The transistor switch 52 has its collector electrode connected through a primary winding 64 of the transformer 56 to one end of the secondary 36 of the exciting transformer 30. The remaining transistor switch 54 has its collector electrode connected through a primary winding 66 of the transformer 58 to the other end of the secondary 34. The common point 50 in the synchronizing circuit 44 is connected to the emitter electrode of both transistors and also to the center tap 36 of the secondary winding 34 of the secondary winding 36. Each of the pulse transformers 56 and 58, respectively, have a pair of secondary windings 68 and 70, respectively.

The polarities of the windings of the transformers 56 and 58 in the drawing are denoted by the usual dot convention. One terminal of the upper (in the drawing) secondary winding 68 of each of the transformers 56 and 58 is coupled through the anode of a diode 72 to the upper gate 60. In like manner, one terminal of the remaining (lower in the drawing) secondary winding 70 of each of the transformers 56 and 58 is coupled through the anode of the respective diodes 74 to the lower (in the drawing) gate 62. The remaining terminal of each of the secondary windings 68 provide another input to the gate 60 and the remaining terminal of each of the secondary windings 70 provide the remaining input to the lower gate 62.

The output from the sensor 16, as derived from terminals 36 and 38, respectively, is coupled through the primary winding 80 of a transformer 82 to the synthesizer circuit 40. More specifically, the transformer 82 includes a secondary winding 84 which is center tapped at 86. The ends of the secondary winding 84 are coupled to the inputs of the respective gates 60 and 62 and the center tap 86 of the secondary winding 84 is connected to the common side of the low pass filter 42 illustrated as a conventional pi network.

The operation of the transducer modulator apparatus, as illustrated in FIG. 1, may perhaps be more readily understood when described in conjunction with the wave forms of FIG. 2. It will be assumed that the power available from the power source is a conventional alternating current 60 cycle signal as illustrated by the wave form 100 in FIG. 2. This 60 cycle signal is converted by the power converter 12 into a direct current signal which supplies power for the oscillator 14. The oscillator 14 typically is designed to oscillate at a much higher frequency, as illustrated by the wave form 102 in FIG. 2. Usually the sensor frequency presumably is more suitable to the operation of the sensor 16. This exciting frequency, generated by the oscillator 14, is passed through the transformer 30 to the sensor 16. An input signal, as exemplified by the wave form 104, whose amplitude is varying in time, positions the element 24 so as to vary the inductance of the inductors 18 and 20 in equal amounts and in opposite senses. The bridge 16 provides a phase or paraphase A.C. output signal, of the oscillator frequency. The phase and amplitude are dependent upon the sense and magnitude, respectively, of the input signal.

In this illustrated case, the input signal is shown as being first of one sense or polarity and then of the other. A phase reversal occurs at the point 107 corresponding to the point at which the input signal 104 goes through zero magnitude. The output of the sensor 16 is an amplitude modulated signal 106 as shown. This amplitude modulated signal 106 is coupled to the transformer 82. Gates 60 and 62 in the synthesizer circuit 40 permit the amplitude modulated sensor signal 106 to selectively pass in accordance with the frequency of the signal from the power source applied to the terminals 10 and the sensor excitation frequency signal from transformer 30. It will be recalled, the signal at the terminals 10 is applied to the inputs of the transistor switches 52 and 54 such that the synchronizing circuit 44 passes gating pulses to the gates 60 and 62 synchronized in time not only with the input power source signal 100 but also with the sensor excitation signal 102. When the wave form of the alternating current power source signal 100 crosses its base line in either direction, one or the other of the transistor switches 52 or 54 conducts thereby providing output pulses which consist of alternating polarity half cycles of the oscillator frequency. These pulses pass through the respective diodes 72 and 74 from the secondary winding 68 or 70 associated with the then conductivity switch transistor. It may be noted that only one gate 60 or 62 of the synthesizer 40 is open at any one time regardless of which transistor switch 52 or 54 is energized.

Assuming that the oscillator frequency is much greater than the power supply frequency so that upper transistor switch 52 can be considered to be closed or "on" and lower transistor switch open or "off," for several cycles of the sensor frequency 102, then gates 60 and 62 switch on an off at the frequency of oscillator 14. They in effect construct first a full wave signal 110 between the common points 81 and 86, having an amplitude proportioned to the amplitude of the sensor output signal, a phase sense determined by the polarity of the input signal 104, and a D.C. component whose polarity is determined by the other polarity of the power source signal 100. When the power frequency signal 100 changes polarity, transistors 52 and 54 interchange their on and off states resulting in a full wave rectified signal 112 between common points 81 and 86 having a D.C. component of opposite polarity to that which occurred during the prior half cycle of the power supply frequency.

In this way the synthesizing circuit 40 synthesizes a suppressed carrier signal at power supply frequency whose amplitude and phase is determined by the input signal. The unfiltered output signal 110–112 is passed through low pass filter 42 and the spurious components of the signal, curves 110-112 of FIG. 2, are removed resulting in the filtered output signal at terminals 43, shown as curve 111 of FIG. 2. This output signal is an amplitude modulated signal having a suppressed carrier and may be easily transmitted to a central station for data processing or other purposes. In the alternative this output signal 111 by itself, since the sensor 16 acts a phase shift circuit, may be applied directly to the second winding of a servo amplifier for the purpose of positioning the servo in some feedback arrangement. For example, in one usage the servo amplifier could be employed to reposition the input linkage 22 to achieve a null-balance condition.

In the event the input power source is a direct current signal, this is also quite satisfactory. In this event, the output derived from the output terminals 43 is in essence the output of the sensor 16 on a D.C. carrier. One or the other of the gates 60, 62 is continuously "on."

There has thus been described a relatively simple transducer system apparatus which may be used in conjunction with any available power source. The sensor portion of the transducer operates from its own oscillator which receives power from the basic source to excite the sensor. The input information on the sensor is extracted and used to amplitude modulate the original power frequency for subsequent utilization.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:

1. Transducer apparatus for converting an input signal into an amplitude modulated output signal comprising:
   power terminal means for receiving a first A.C. signal having a first frequency;
   signal generating means coupled to said power terminal means for producing a second A.C. signal having a second frequency higher than said first frequency;
   means for amplitude modulating said second A.C. signal in response to said input signal to provide a dual polarity amplitude modulated signal;
   means for producing two gating signals synchronized with said second A.C. signal and respectively coincident with the two alternately occurring opposite polarity half cycles of said first A.C. signal.
   gating means for conducting one or the other polarity of said dual polarity amplitude modulated signal and for reversing the polarity thereof in response to said alternately occurring two gating signals, thereby to provide an A.C. output signal at said first frequency which is amplitude modulated in accordance with said input signal.

2. The transducer apparatus of claim 1, wherein said input signal is a mechanical displacement, and said means for amplitude modulating said second A.C. signal includes sensor means excited by said second A.C. signal for varying the amplitude of said second A.C. signal in response to said mechanical displacement.

3. The transducer apparatus of claim 2, wherein said sensor means shifts the phase of said amplitude modulated signal to one or the other of complementary phase relationship to said second A.C. signal in response to a change in the direction sense of said mechanical displacement with respect to a predetermined position.

4. The transducer apparatus of claim 3, said sensor means including:
   a series arrangement of impedances connected across said signal generating means; and
   means for varying the reactances of said impedances in equal but opposite senses in accordance with said mechanical displacement.

5. The transducer apparatus of claim 1,
said signal generating means including:
   means coupled to said power terminal means for converting said first A.C. signal to D.C. power; and
   oscillator means driven by said D.C. power for producing said second A.C. signal;
said means for amplitude modulating said second A.C. signal including:
   an arrangement of impedances having reactive elements which vary in response to said input signal; and
   first transformer means for coupling said second A.C. signal from said oscillator means to said arrangement of impedances;
said gating means including:
   first and second switches each having an input terminal, an output terminal, and a gate control input for receiving one or the other of said first and second gating signals;
   second transformer means for coupling the input terminals of said first and second switches respectively to opposite polarities of the amplitude modulated signal from said first transformer means and said sensor means;
   means for coupling the output terminals of said first and second switches in common to provide said A.C. output signal at said first frequency which is amplitude modulated in accordance with said input signal; and
said means for producing said two gating signals including:
   first transformer and rectifier means for selectively coupling one polarity of said second A.C. signal to the gate control terminal of said first switch;
   second transformer and rectifier means for selectively coupling the other opposite polarity of said second A.C. signal to the gate control terminal of said second switch;
   first means responsive to one polarity of said first A.C. signal for enabling said first transformer and rectifier means; and
   second means responsive to the other opposite polarity of said first A.C. signal for enabling said second transformer and rectifier means.

6. The transducer apparatus of claim 5, wherein the last name coupling means of said gating means including low pass filter means for removing frequency components corresponding to said second A.C. signal.

References Cited

UNITED STATES PATENTS

| | | | |
|---|---|---|---|
| 2,601,474 | 6/1952 | Van Zelst | 179—1 |
| 2,740,950 | 4/1956 | Grillo | 340—209 X |
| 3,027,516 | 3/1962 | Brouwer | 332—2 X |
| 3,028,504 | 4/1962 | Close | 332—2 X |
| 3,046,535 | 7/1962 | Philbin et al. | 340—209 X |
| 3,020,398 | 2/1962 | Hyde | 325—138 X |

JOHN W. CALDWELL, Primary Examiner

B. V. SAFOUREK, Assistant Examiner

U.S. Cl. X.R.

332—2; 340—209